Aug 5, 1941.    M. N. FAIRBANK    2,251,330
VARIABLE DENSITY SUNGLASS
Filed Nov. 9, 1939
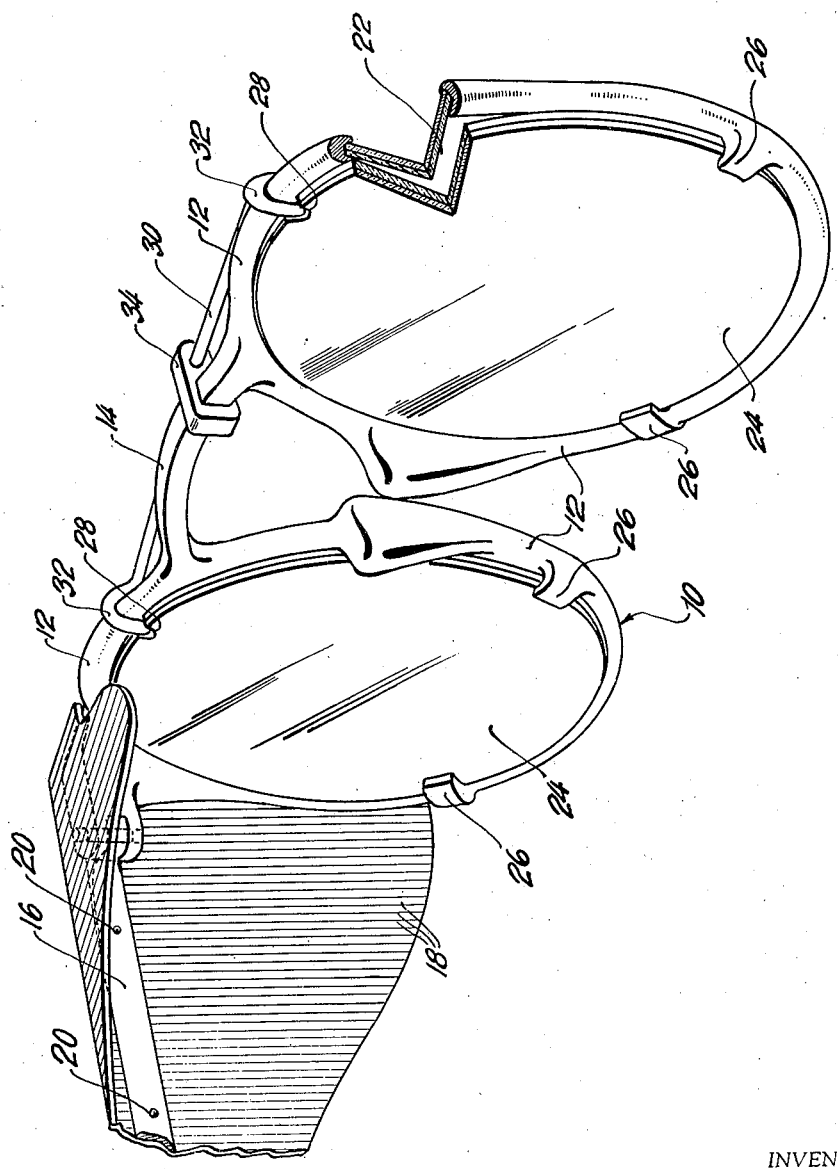
INVENTOR.
Murry N. Fairbank
BY
Brown & Jones
ATTORNEYS Patented Aug. 5, 1941

2,251,330

UNITED STATES PATENT OFFICE 2,251,330

VARIABLE DENSITY SUNGLASS

Murry N. Fairbank, Boston, Mass., assignor to Polaroid Corporation, Dover, Del., a corporation of Delaware Application November 9, 1939, Serial No. 303,560

4 Claims. (Cl. 88—41)

This invention relates to a new and improved variable density sunglass or the like.

An object of the invention is to provide an ophthalmic mounting for a variable density viewing device, such as a sunglass or the like, which is light in weight, efficient in operation, and easily manufactured.

Further objects of the invention are to provide an ophthalmic mounting or frame for a variable density sunglass in which a fixed lens or viewing screen is positioned adjacent each eye of the user, together with a cooperating rotatable lens viewing screen; and to provide simple, light-weight means associated with the frame for detachably holding the rotatable lens in position to overlie the fixed lens; to provide means for keying together the two rotatable lenses; to provide such means slidably mounted upon the bridge of the frame; and to provide a keying element of the character described which cooperates with a plurality of lens-positioning elements to hold each rotatable lens in position in the mounting.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, which represents in perspective and with parts broken away a sunglass or other viewing device embodying one form of the invention.

This application relates to an improved form of variable density sunglass or visor of the type described in the United States patent to Land No. 2,005,426, which issued June 18, 1935.

With reference to the drawing, 10 represents generally an ophthalmic frame of the spectacle type and comprising lens mounting means 12, a central bridge 14, and bows 16 hingedly connected to the lens mounting means. In one form of the invention the bows may be provided with side guards 18 riveted as at 20 to the bow elements and adapted to block light which would normally strike the rear surfaces of the lens elements held in the mounting, and thus give rise to undesired reflections.

The lens mounting means 12 are adapted to hold and position adjacent each eye of the wearer of the mounting a plurality of lenses, a fixed lens 22, which is fixedly positioned in the frame in the usual manner, and a rotatable lens 24, which may be held detachably adjacent and overlying the fixed lens 22.

Either or both of the lenses adjacent each eye of the wearer may be flat or curved and may or may not be ground to a predetermined prescription. In the simplest form of the device neither lens has any power.

Each lens adjacent each eye of the wearer may preferably comprise a light-polarizing element which may if desired be laminated to or between glass cover plates or other protective elements. In the preferred form of the invention the fixed lenses are positioned furthest from the eyes of the wearer, i. e., with the rotatable lenses adjacent their inner surfaces. The polarizing axes of the light-polarizing elements which comprise the fixed lenses are preferably positioned to block horizontally vibrating polarized light. Under these circumstances the variable density sunglass acts to block most of the undesired glare, as for example the glare from the surface of water, wet pavements and the like, irrespective of the position of the polarizing axes of the inner rotatable lenses 24.

The rotatable lenses 24 may be held in position against the inner surfaces of the fixed lenses 22 or slightly spaced therefrom by the protruding lugs and mounting elements 26 which may be integral with the lens mounting portions of the frame 12, and which may be so positioned that in the absence of other restraining means the inner rotatable lenses may be readily removed from the frame, so that the surfaces between the rotatable and fixed lenses may be easily cleaned.

Each of the rotatable lens elements may be notched, as at 28, the notches acting as keying means, so that when they are connected, as for example by a strap or other connecting element, such as the element 30, rotation of one lens 24 will insure the same rotation and in the same direction of the other lens 24.

The lenses 24 are preferably positioned with respect to the lenses 22 so that at one extreme limit of motion of the element 30 the polarizing axes of the lenses 24 are substantially crossed with the polarizing axes of the lenses 22, while at the other extreme limit of motion of the element 30 the polarizing axes of the lenses 24 may be nearly parallel to the polarizing axes of the lenses 22. Under these circumstances when the element 30 is moved laterally from side to side, thus causing simultaneous rotation of the rotatable lenses 24, the density of each pair of lens elements is altered from a maximum density when the polarizing axes of the lenses are crossed to a minimum density when they are nearly parallel.

The element 30 may preferably be a strap or cylindrical strip having its ends looped, as at 32, to overlie and engage the lens mounting means 12 and to engage the notches 28 in the rotatable lenses 24. The element 30 may preferably conform generally in shape to the upper edge of the lens mounting means 12 and the bridge 14. It may be provided with a finger grip and supporting element 34 to which it may be rigidly affixed and which in turn may be mounted for lateral movement upon the bridge 14. Preferably the strap member 30 is resilient and under slight spring tension so that its extreme ends bear against the notches 28, thus cooperating with the lugs 26 to hold the inner rotatable lenses 24 in position.

When it is desired to remove the lenses 24 from the frame, either for the purpose of cleaning the surfaces of the lenses or to convert the variable density glass to an ordinary sunglass, the strap member 30 may be bent slightly so as to release the end of the loops 32 from contact with the notches 28 in the lenses 24, and the lenses 24 may then be slipped from engagement with the lugs 26.

The strap-supporting element 34 is preferably mounted to slide upon the bridge 14 of the frame 10 freely, but with such frictional contact with the bridge as will prevent displacement of the element 34 thereon unless it is deliberately moved.

It will be apparent that while the structure has been described in connection with a spectacle frame, it is adapted for use also with a pince nez type of frame. The mounting described is light in weight, it may be readily constructed, it is cheap and efficient. It permits easy cleaning of adjacent surfaces of the lens elements and insures proper correlation between the rotation of one of the elements 24 with that of the other of those elements.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention which, as a matter of language, might be said to fall therebetween.

Having described my invention, what I claim as new and desire to secure by Letters Patent is:

1. An ophthalmic mounting for a variable density sunglass or the like comprising a bridge element, a plurality of lens-holding elements affixed to said bridge element, a plurality of spaced lug elements affixed to each of said lens-holding elements for detachably holding thereadjacent a supplemental lens, and a laterally movable, resilient, strap element mounted in means slidably carried upon said bridge, said strap element being provided at each end with a loop engaging and bearing against the upper surface of the adjacent lens-holding element, the free end of each said loop being shaped to engage a notch in an adjacent supplemental lens.

2. A variable density sunglass comprising an ophthalmic mounting comprising a bridge and a plurality of lens-holding means, each lens-holding means comprising means for fixedly holding and positioning, before an eye of a wearer of the mounting, a lens, and means comprising lug elements for detachably holding a second lens adjacent said fixedly mounted lens, a plurality of lenses positioned in said mounting before each eye of a wearer thereof, one of said lenses being fixedly mounted, another of said lenses being rotatably and detachably mounted, and a resilient strap-like element laterally movable with respect to said mounting and carried by means slidably mounted on said bridge, each end of said strap-like element being provided with a loop overlying and bearing against the means for holding said fixedly mounted lenses, the free end of each loop being positioned within a notch in the adjacent rotatably mounted lens, said loops cooperating with said lug means for holding said rotatably mounted lenses in position.

3. A variable density sunglass comprising an ophthalmic mounting comprising a bridge and a plurality of lens-holding means, each lens-holding means comprising means for fixedly holding and positioning, before an eye of a wearer of the mounting, a lens, and means comprising lug elements for detachably holding a second lens adjacent said fixedly mounted lens, a plurality of lenses positioned in said mounting before each eye of a wearer thereof, one of said lenses being fixedly mounted, another of said lenses being rotatably and detachably mounted, and a resilient strap-like element laterally movable with respect to said mounting and carried by means slidably mounted on said bridge, each end of said strap-like element being provided with a loop overlying and bearing against the means for holding said fixedly mounted lenses, the free end of each loop being positioned within a notch in the adjacent rotatably mounted lens, said loops cooperating with said lug means for holding said rotatably mounted lenses in position, said rotatably mounted lenses being positioned adjacent the inner faces of said fixedly mounted lenses.

4. A variable density sunglass comprising an ophthalmic mounting comprising a bridge and a plurality of lens-holding means, each lens-holding means comprising means for fixedly holding and positioning, before an eye of a wearer of the mounting, a lens, means comprising lug elements for detachably holding a second lens adjacent said fixedly mounted lens, a plurality of lenses positioned in said mounting before each eye of a wearer thereof, one of said lenses being fixedly mounted, another of said lenses being rotatably and detachably mounted, and a resilient strap-like element laterally movable with respect to said mounting and carried by means slidably mounted on said bridge, each end of said strap-like element being provided with a loop overlying and bearing against the means for holding said fixedly mounted lenses, the free end of each loop being positioned within a notch in the adjacent rotatably mounted lens, said loops cooperating with said lug means for holding said rotatably mounted lenses in position, all of said lenses comprising light-polarizing elements.

MURRY N. FAIRBANK.